(12) United States Patent
Chou (10) Patent No.: US 8,311,337 B2
(45) Date of Patent: Nov. 13, 2012

(54) SYSTEMS AND METHODS FOR ORGANIZING AND ACCESSING FEATURE VECTORS IN DIGITAL IMAGES

(75) Inventor: Hung-Te Chou, Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 374 days.

(21) Appl. No.: 12/815,595

(22) Filed: Jun. 15, 2010

(65) Prior Publication Data

US 2011/0305374 A1   Dec. 15, 2011

(51) Int. Cl.
G06K 9/46 (2006.01)

(52) U.S. Cl. ........ 382/190; 382/195; 382/305; 382/112; 382/224; 382/225; 382/226; 382/274; 382/159; 382/173; 382/181; 382/220

(58) Field of Classification Search .................. 382/190, 382/195, 305, 112, 224, 225, 226, 274, 159, 382/173, 181, 220
See application file for complete search history.

(56) References Cited

U.S. PATENT DOCUMENTS

| | | | |
|---|---|---|---|
| 7,003,139 B2 | 2/2006 | Endrikhovski et al. | |
| 7,271,809 B2 | 9/2007 | Fedorovskaya et al. | |
| 7,274,822 B2 | 9/2007 | Zhang et al. | |
| 7,437,005 B2 | 10/2008 | Drucker et al. | |
| 7,505,621 B1 * | 3/2009 | Agrawal et al. | 382/118 |
| 7,515,739 B2 | 4/2009 | Porter et al. | |
| 7,809,192 B2 * | 10/2010 | Gokturk et al. | 382/176 |
| 2002/0149681 A1 | 10/2002 | Kahn et al. | |
| 2003/0108223 A1 | 6/2003 | Prokoski | |
| 2003/0130035 A1 | 7/2003 | Kanarat | |
| 2004/0239983 A1 | 12/2004 | Shiota | |
| 2005/0105780 A1 | 5/2005 | Ioffe | |
| 2006/0140455 A1 | 6/2006 | Costache et al. | |
| 2006/0170791 A1 | 8/2006 | Porter et al. | |
| 2006/0251292 A1 | 11/2006 | Gokturk et al. | |
| 2006/0274949 A1 | 12/2006 | Gallagher et al. | |
| 2007/0122010 A1 | 5/2007 | Kitamura et al. | |
| 2008/0037827 A1 | 2/2008 | Corcoran et al. | |
| 2008/0130960 A1 | 6/2008 | Yagnik | |
| 2008/0263103 A1 | 10/2008 | McGregor et al. | |
| 2008/0288355 A1 | 11/2008 | Rosen | |
| 2008/0298643 A1 | 12/2008 | Lawther et al. | |
| 2008/0298766 A1 | 12/2008 | Wen et al. | |
| 2008/0304755 A1 | 12/2008 | Xiao et al. | |
| 2009/0023472 A1 | 1/2009 | Yoo et al. | |
| 2009/0040315 A1 | 2/2009 | Nakase et al. | |
| 2009/0135269 A1 | 5/2009 | Nozaki et al. | |
| 2009/0153676 A1 | 6/2009 | Nakase et al. | |

FOREIGN PATENT DOCUMENTS

WO   2006064455   6/2006

* cited by examiner

Primary Examiner — Mike Rahmjoo
(74) Attorney, Agent, or Firm — McClure, Qualey & Rodack, LLP (57) ABSTRACT

Systems and methods for incorporating restricted access to feature vectors are described. A method is described for storing and accessing feature vectors relating to individuals in digital images. One or more individuals are identified within photos, and feature vectors are generated for individuals in one or more photos. User profiles are downloaded from a database over a network. The feature vectors and downloaded user profiles are grouped. The face tagging system collects tags for the generated grouped feature vectors for generating enhanced user profiles for the individuals, and the enhanced user profiles are stored in a storage resource.

24 Claims, 9 Drawing Sheets

SYSTEMS AND METHODS FOR ORGANIZING AND ACCESSING FEATURE VECTORS IN DIGITAL IMAGES

TECHNICAL FIELD

The present disclosure generally relates to electronic photo management and more particularly, relates to organizing and accessing feature vectors in digital images.

BACKGROUND

With the widespread use of digital cameras, many individuals turn to image management tools for archiving and organizing their digital photographs. Image management tools found on the market offer various features. Using such tools, archived images may be later viewed by the individual or published for others to view. Image management tools may also be used to search for particular individuals, landscapes, or other objects within a collection of photographs. Such applications may be useful, for example, when a user wishes to identify all photos of a particular individual. Challenges may arise, however, when trying to organize and search through a large volume of photos, particularly as more photos are added to an individual's archive and as the photos cover an increasing number of events. Furthermore, an individual may want to display a subset of photos based on, for example, a particular person, landscape, or other criteria. While manually organizing photos is an alternative, this approach can be tedious and time-consuming.

SUMMARY

Briefly described, one embodiment, among others, is a computer-implemented method for storing and accessing feature vectors relating to individuals in digital images. The method comprises identifying one or more facial region within photos, generating feature vectors for the one or more facial regions in one or more photos using a face tagging system, and downloading user profiles from a database over a network. The method further comprises grouping the feature vectors and downloaded user profiles and collecting, by the face tagging system, tags for the generated grouped feature vectors for generating enhanced user profiles for the individuals. The enhanced user profiles are stored in a storage resource.

Another embodiment is a system for storing and accessing feature vectors relating to individuals in digital images. The system comprises a feature vector module for receiving digital photos and user profiles, extracting feature vectors of individuals. The system further comprises a correlator configured to group the feature vectors and the user profiles according to individuals, and a tag module configured to receive a tag for the generated grouped feature vectors for generating enhanced user profiles for the individuals.

Another embodiment is a computer-readable medium comprising computer-program instructions executable by a processor. The computer-program instructions comprise instructions for generating feature vectors for individuals in digital photos received by a face tagging system, downloading user profiles from a database over a network, grouping the feature vectors and downloaded user profiles, receiving tags for the generated grouped feature vectors and downloaded user profiles for generating enhanced user profiles for the individuals, and storing the enhanced user profiles to a storage resource.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As discussed earlier, challenges may arise when trying to organize and search through a large volume of photos, particularly as more photos are added to an individual's archive and as the photos cover an increasing number of events. In many cases, an individual may desire to only display a subset of photos based on, for example, a particular person, landscape, or other criteria. While manually organizing photos is an alternative, this approach can be tedious and time-consuming. Various embodiments are described for reducing the time and effort spent in tagging objects and/or individuals within digital images. Note that while various systems and methods are described in the context of photos depicting individuals, it should be emphasized that the techniques may also be applied to objects and/or landscapes.

For purposes of this disclosure, people tagging relates to identifying the faces of one or more individuals and associating the one or more faces with a tag comprising a name, e-mail, descriptor, or other identifying information. Various embodiments are implemented in a face recognition system and are directed to classifying a first set of photos and generating feature vectors for each face in the one or more photos received by the face recognition system. Such feature vectors may relate to facial features (e.g., distance from the eyes to the nose, distance from the eyes to the mouth) or other features (e.g., hair style, hair color, clothing). Each of the classified group of feature vectors associated with an individual is then tagged.

The tagged feature vectors are then stored in a database for future access. For exemplary embodiments, accessibility to the stored feature vectors may be restricted. A face tagging system analyzes a second or subsequent set of digital images. Based on the analysis, the face tagging system may determine that a match exists between the current set of feature vectors and a group of feature vectors already stored in the database. Depending on the access level of the current individual using the face tagging system, the feature vectors may be used to automatically tag photos.

To address privacy concerns and other security issues, restricted access to the database of feature vectors is incorporated. For some embodiments, this may comprise granting access to only a subset of the feature vectors in the database. As a nonlimiting example, the user may be granted access to only those feature vectors associated with that user. Based on the identified match, the face tagging system determines that the second set of feature vectors in the subsequent set of digital images is associated with the same person. In this regard, one embodiment, among others, is directed to a method implemented in a face tagging system for tagging individuals. The method comprises identifying one or more individuals within photos, generating feature vectors for individuals in one or more photos using the face tagging system, and receiving by the face tagging system, tags for the generated feature vectors and storing the feature vectors and associated tags in a restricted access database.

The method further comprises establishing an access level for the stored feature vectors and associated tags and receiving an access request from a remote system to the stored feature vectors and associated tags. For some embodiments, the method further comprises granting access based on the established access level. It should be noted that in addition to addressing privacy and security concerns, network bandwidth utilization may also be reduced by sending only a portion of the feature vectors across a network to other face tagging systems.

Figure 1:
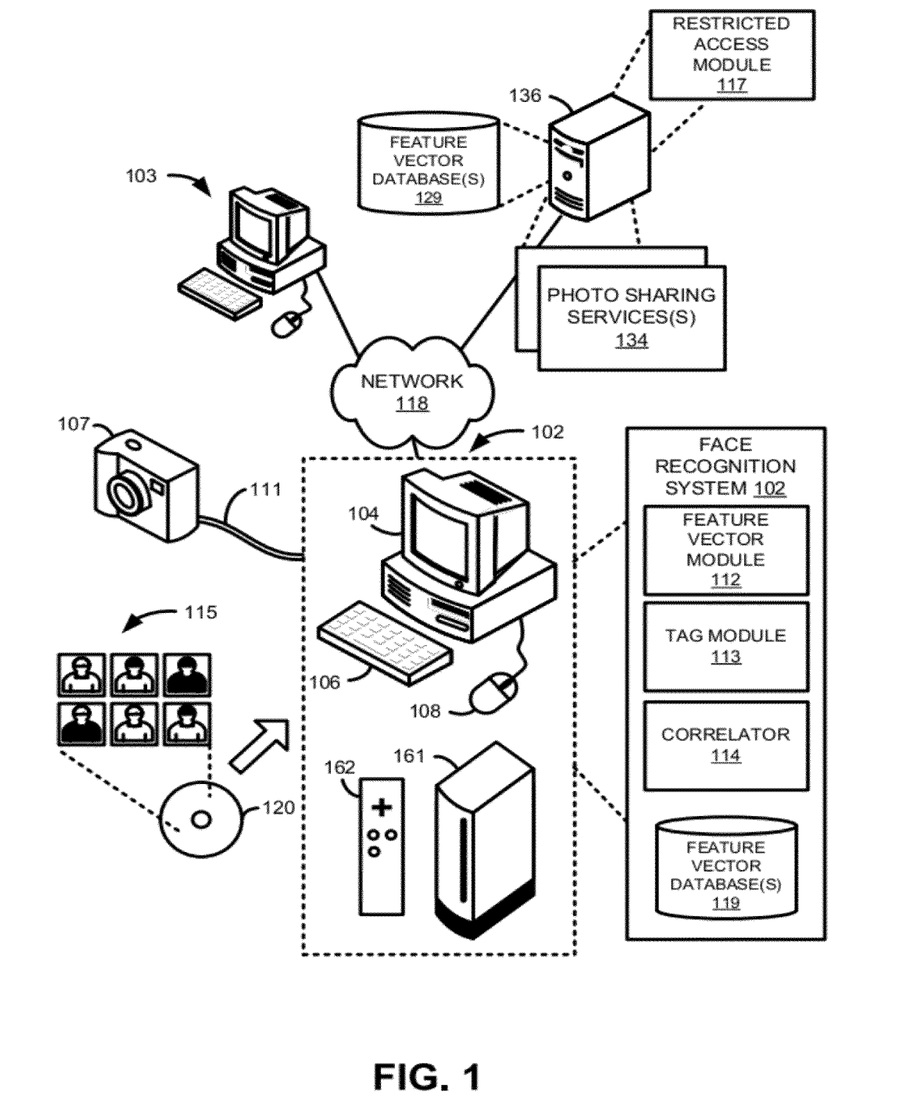
FIG. 1 depicts a top-level flow diagram for an embodiment of face tagging system.

Having described the general framework of a face tagging system, various components of an environment in which various embodiments are implemented are now described followed by a description of the operation of these components. FIG. 1 depicts a top-level diagram of a face tagging system 102 for creating a summary of photos according to user input. The face tagging system 102 may be embodied, for example, as a desktop computer, computer workstation, laptop, or other computing platform. The face tagging system 102 includes a display 104 and input devices such as a keyboard 106 and a mouse 108 for receiving user input. In other embodiments, the face tagging system 102 may also be embodied as a video gaming console 161, which includes a video game controller 162 for receiving user preferences. For such embodiments, the video gaming console 161 may be connected to a television (not shown) or other display.

The face tagging system 102 receives a second or subsequent batch of photos 115 for analysis. Again, the face tagging system 102 begins by identifying the facial regions within the subsequent batch of photos 115 and extracts or determines information relating to features within the facial regions. The correlator 114 in the face tagging system 102 determines whether the current set of feature vectors correspond to any of the previously derived feature vectors. The correlator 114 may correlate two sets of feature vectors by identifying common attributes. For example, the correlator 114 may correlate two sets of feature vectors if the distances between facial features (e.g., between the eyes and mouth, eyes and nose, nose and mouth) closely match. Based on matching feature vectors, the correlator 114 determines that the photos corresponding to the matched feature vectors relate to the same individual. Based on the tag associated with the previously derived feature vectors, the individual is identified. The correlator 114 is further configured to group photos 115 based on their attributes. By way of illustration, suppose feature vector set A comprises a collection of photos and feature vector set B comprises another collection of photos. For some implementations, the correlator 114 is configured to analyze the attributes associated with each respective set of feature vectors. If the correlator 114 determines that the two sets (i.e., Set A and Set B) exhibit common attributes, then the correlator 114 merges Set A and Set B to form a common set of feature vectors corresponding to a particular individual, thereby increasing the efficiency and accuracy of identifying individuals by using an expanded or enhanced set of feature vectors.

The face tagging system 102 comprises a feature vector module 112, which receives a collection of photos 115 and analyzes the photos 115. For some implementations, the feature vector module 112 may first identify the facial regions for each photo and analyze the features within the identified facial regions using known facial recognition techniques. Based on the analysis, the feature vector module 112 stores information relating to the analyzed features/attributes in the form of feature vectors. For some embodiments, the feature vectors may be stored as records indexed according to such categories as user profiles, objects, landscapes, and so on. The face tagging system 102 further comprises a tag module 113 configured to receive user input and tags for grouped feature vectors. In particular, the tag module 113 receives tags comprising such information as individuals' names, e-mail addresses, and/or other descriptors and associates these tags with corresponding feature vectors. For some implementations, the user-specified tags may be embedded in the feature vectors. Thus, where the feature vector is stored as a record, the user-specified tag may be stored in a field within the record.

The face tagging system 102 further comprises a restricted access module 117. For some embodiments, the restricted access module 117 may be implemented in one of the servers 136 shown in FIG. 1 and is configured to control access to derived feature vectors. In this regard, tiered access may be implemented using the restricted access module 117 to address security and privacy issues. As a nonlimiting illustration, consider a first individual, John. The restricted access module 117 may be configured to limit access by John to only those feature vectors associated with him. A second user, Laura, may elect to grant access to feature vectors associated with her to John such that John may then utilize Laura's feature vectors to identify subsequent photos 115 of her. The levels of access may be configured such that by default, John would normally not have access to feature vectors associated with Laura. For some embodiments, the restricted access module 117 maintains user profiles for incorporating restricted access to the database, as will be described later in more detail. The user profiles may be stored with the feature vectors in the database. The database 119 stores the feature vectors derived by the feature vector module 112. For some embodiments, the database 119 also stores information relating to access levels for the feature vectors. The stored feature vectors may later be accessed according to the access levels that have been established.

The face tagging system 102 is configured to receive digital images 115 stored on a storage medium such as, for example, a compact disc (CD) 120 or a universal serial bus (USB) flash drive. As one of ordinary skill will appreciate, the digital images 115 may be encoded in any number of formats, including but not limited to, JPEG (Joint Photographic Experts Group) files, TIFF (Tagged Image File Format) files, PNG (Portable Network Graphics) files, GIF (Graphics Interchange Format) files, and BMP (bitmap) files. As depicted in FIG. 1, the face tagging system 102 may also receive digital images 115 directly from a digital camera 107 via a cable 111 or some other interface. The face tagging system 102 may support any one of a number of common computer interfaces, such as, but not limited to IEEE-1394 High Performance Serial Bus (Firewire), USB, a serial connection, and a parallel connection.

The digital camera 107 may also be coupled to the face tagging system 102 over a wireless connection or other communication path. The face tagging system 102 may be coupled to a network 118, such as the Internet or a local area network (LAN). Through the network 118, the face tagging system 102 may receive digital images 115 from another computing system 103. Alternatively, the face tagging system 102 may access one or more photo sharing services 134 (e.g., Picassa from Google, Flickr®) hosted on a server 136 via the network 118 to retrieve digital images 115. Furthermore, the face tagging system 102 may access one or more feature vector databases 129 on the server 136 via the network 118 to tag photos 115. More details regarding the use of feature vector databases to tag photos 115 are described later.

Figure 2:
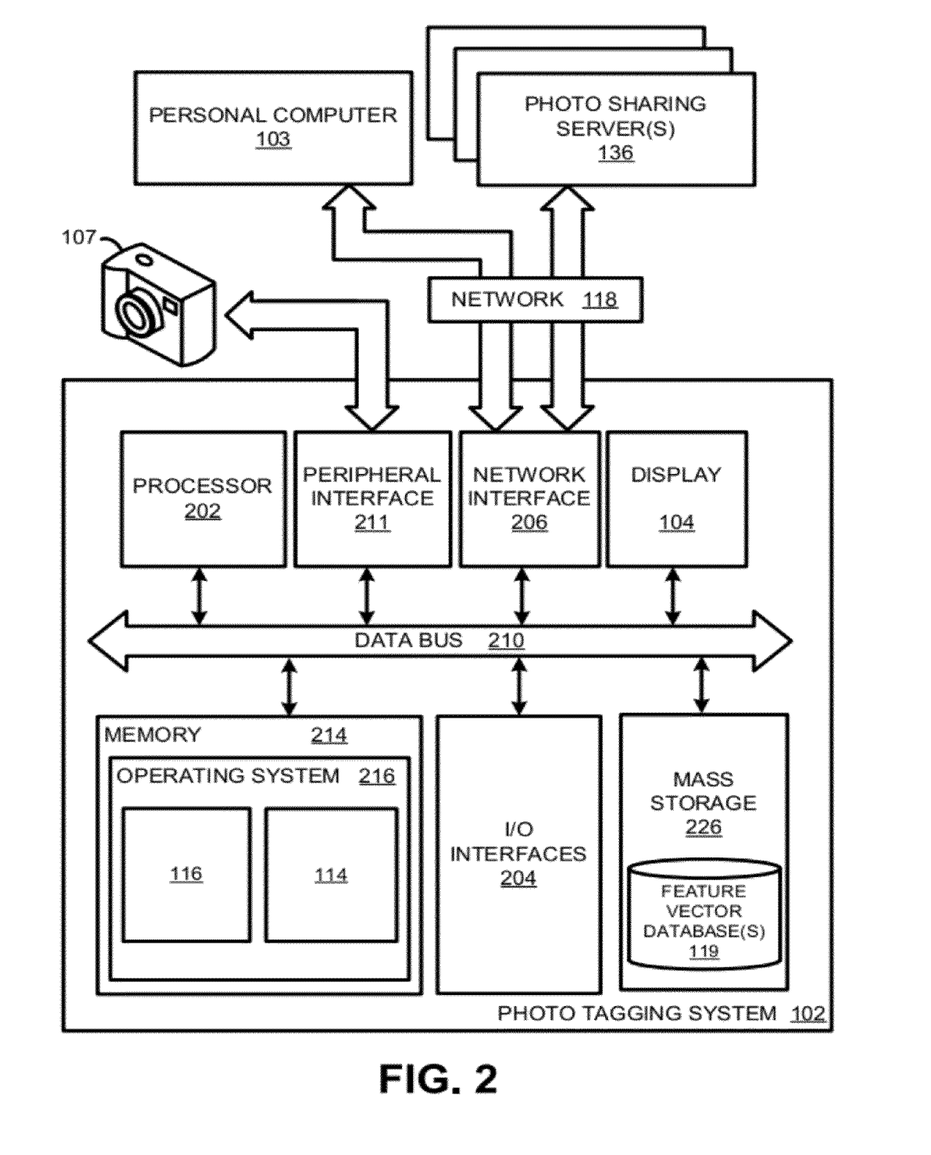
FIG. 2 illustrates various components of the face tagging system shown in FIG. 1.

FIG. 2 illustrates an embodiment of the face tagging system 102 shown in FIG. 1. The face tagging system 102 may comprise any one of a wide variety of wired and/or wireless computing devices, such as a desktop computer, portable computer, dedicated server computer, multiprocessor computing device, smartphone, personal digital assistant (PDA), and so forth. As shown in FIG. 2, the face tagging system 102 comprises memory 214, a processing device 202, a number of input/output interfaces 204, a network interface 206, a display 208, a peripheral interface 211, and mass storage 226, wherein each of these devices are connected across a local data bus 210.

The processing device 202 may include any custom made or commercially available processor, a central processing unit (CPU) or an auxiliary processor among several processors associated with the face tagging system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise the feature vector module 112, tag module 113, correlator 114, and restricted access module 117 of FIG. 1. In accordance with such embodiments, these components 112, 113, 114, 117 are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the face tagging system 102 comprises a personal computer, these components may interface with user input device 204, which may be a keyboard or a mouse, as shown in FIG. 1. Display 208 can comprise a computer monitor or a plasma screen for a PC or a liquid crystal display (LCD) on a hand held device, for example. As will be described in more detail later, a user may enter selections via a user interface rendered on the display 104 using the input/output interfaces 204.

In the context of this disclosure, a computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface device 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). As shown in FIG. 2, the face tagging system 102 may communicate with one or more servers 136 or another computing system 103 via the network interface 206 over the network 118. The face tagging system 102 may further comprise mass storage 226 in which the feature vector database(s) 119 of FIG. 1 may be implemented. The peripheral 211 interface supports various interfaces including, but not limited to IEEE-1394 High Performance Serial Bus (Firewire), USB, a serial connection, and a parallel connection.

Figure 3:
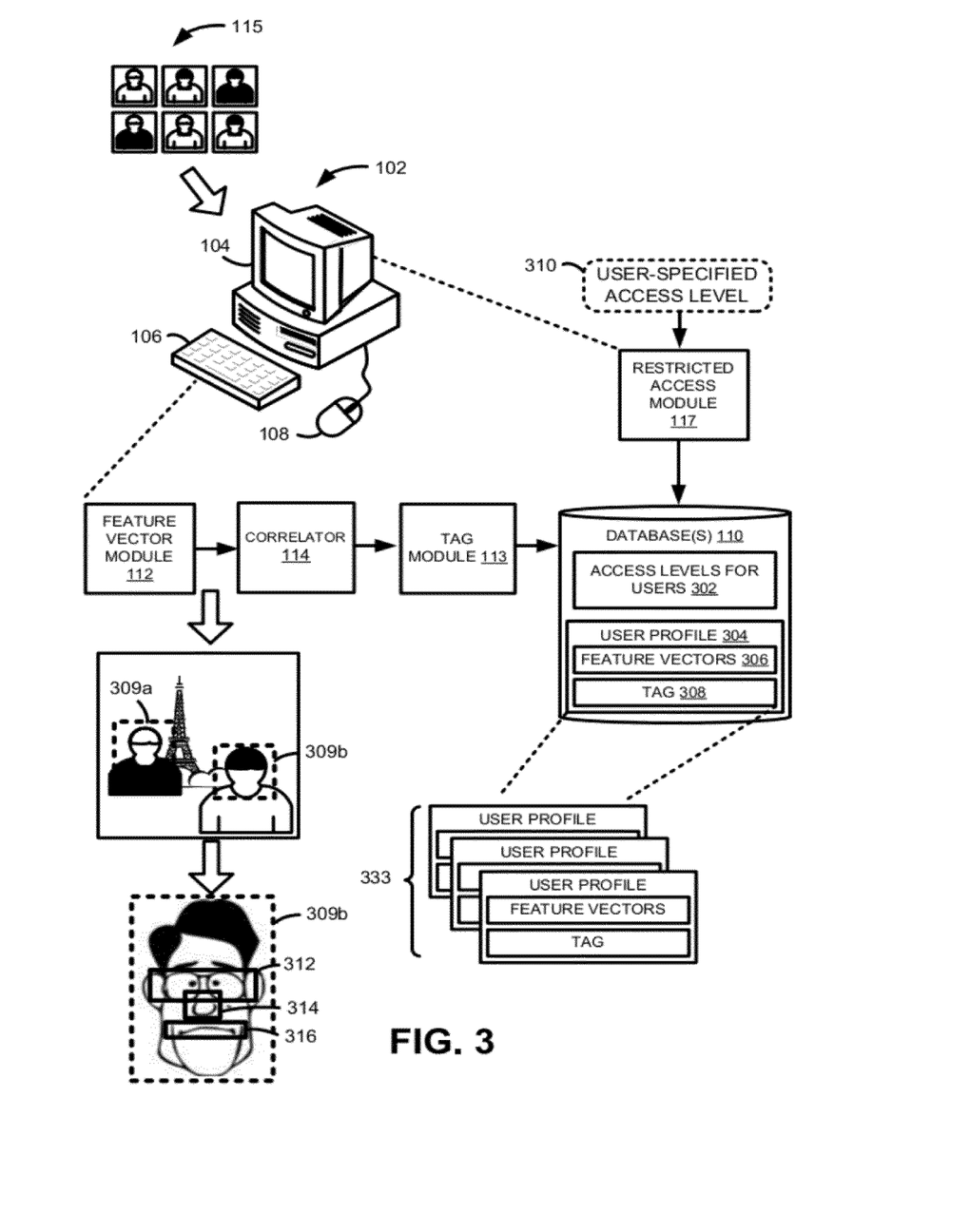
FIG. 3 provides a flow diagram involving the various components of the face tagging system of FIGS. 1 and 2.

Reference is now made to FIG. 3, which provides a flow diagram for the various components of the face tagging system 102 of FIG. 1. Upon receiving a batch of photos 115 by the face tagging system 102, the feature vector module 112 performs analysis to extract information regarding features vector in the photos 115. As discussed earlier, for some implementations this may comprise identifying facial regions 309a, 309b within the photos 115 and identifying facial features 312, 314, 316 within those facial regions 309a, 309b to generate feature vectors. The correlator 114 is configured to determine whether a current set of feature vectors correspond to any of the previously derived feature vectors and correlates two sets of feature vectors by identifying common attributes. For example, the correlator 114 may correlate two sets of feature vectors if the distances between facial features (e.g., between the eyes and mouth, eyes and nose, nose and mouth) closely match. Based on matching feature vectors, the correlator 114 determines that the photos corresponding to the matched feature vectors relate to the same individual. The correlator 114 may be further configured to merge matching feature vectors.

The tag module 113 receives as user input, tag information to be associated with the grouped feature vectors. The tag module 113 then forwards the feature vectors with the associated tag to a database 110 or other data storage structure. The entry comprising a feature vector and associated tag may be stored in the form of a record or other logical entry into the database, whereby the record is indexed for future access. In the event that no entries have been created yet in the database 110, the first entry comprising a feature vector and associated tag acts as a baseline for subsequent photos that are received.

As shown in FIG. 3, for some implementations, the output of the feature vector module 112 is sent directly to the tag module 113 for further processing. However, for some embodiments, such as the one shown in FIG. 3, the feature vector module 112 forwards the output to the correlator 114, which then determines whether sets of feature vectors can be merged to form an expanded or enhanced set of feature vectors, which is then sent to the tag module 113 for further processing. The database 110 stores access levels for users 302 in addition to one or more sets of feature vectors 306. Each feature vector 306 may have an associated tag 308 and user profile 304. As shown, the database 110 may comprise a table of entries 333 which may be indexed according to one of the fields 304, 306, 308. For example, the table of entries 333 can be accessed or sorted according to the user profile 304, feature vector 306, or a particular tag 308. The table of entries 333 may also be accessed or sorted according to attributes defined by the feature vectors 306, such as, but not limited to the distance from the eyes to the nose, the distance from the eyes to the mouth), and other features such as hair style, hair color, and clothing.

The restricted access module 117 is further configured to establish a user profile 304 for the individual associated with the tagged feature vector 306. The user profile 304 is assigned a level of access by the restricted access module 117 to control access to the database 110 and serves as a means of indexing the database 110. For some embodiments, the restricted access module 117 limits each user to that person's feature vector by default. However, the access levels 302 for each user profile is configurable. In yet other embodiments, the restricted access module 117 may define user access 302 to another user's feature vector based on the fact that the two users are in at least one photo together. By way of illustration, consider a scenario in which John and Laura are depicted together in a photo 115. The restricted access module 117 may be configured to allow John to access feature vector associated with Laura and vice versa. In other embodiments, the access levels for users may be set according to user-specified access level(s) 310. Through the restricted access module 117, privacy issues and other security concerns are addressed. It should also be noted that by restricting access to a subset of the feature vectors, bandwidth requirements are also reduced. This can be useful, for example, when another computing system 103 accesses the database 110 through a network, such as the Internet 118, as depicted in FIG. 1. More details regarding the restricted access mechanism are described later.

In view of the foregoing, one embodiment is directed to a face tagging system 102 for tagging individuals comprises a feature vector module 112 for receiving digital photos 115, extracting feature vectors 306 of individuals, and storing the feature vectors 306 in a database 110, the correlator 114 is further configured to classify the feature vectors 306 according to distinct groups. The face tagging system 102 further comprises a tag module 113 configured to receive a tag for each distinct group of feature vectors.

Figure 4:
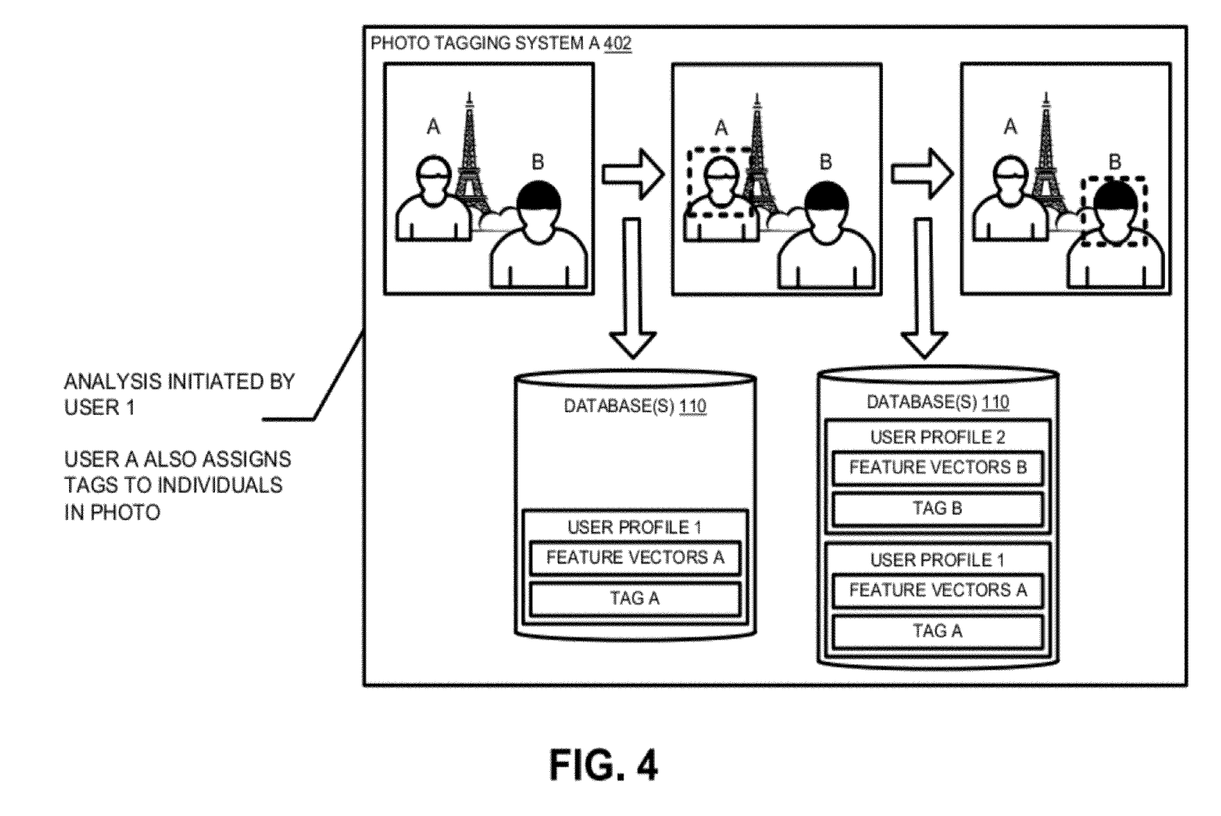
FIG. 4 illustrates a process in which entries are added to the database of FIG. 3.

Reference is now made to FIGS. 4-7, which illustrate the various embodiments for restricting access to a database 110 containing feature vectors 306. FIG. 4 illustrates a process in which entries are added to the database 110 of FIG. 3. In the nonlimiting example shown, a user (User 1) initiates facial region analysis using a first face tagging system 102. In the example photo, two individuals are identified, and features vectors are extracted from the facial regions. A first entry comprising feature vectors A and Tag A associated with individual A is stored in the database 110. (Feature vectors are extracted from photos 115.) The tag (Tag A) may be specified by the user. As shown, a User Profile 1 associated with individual A is also established. The user profile is later utilized by the restricted access module 117 to control access to feature vectors within the database 110. As shown in FIG. 4, a second set of feature vectors (feature vectors B) associated with the second individuals (individual B) is derived. User 1 further assigns Tag B to feature vectors B, and the database 110 is updated accordingly. Note that a second user profile (User Profile 2) associated with individual B is established.

Figure 5:
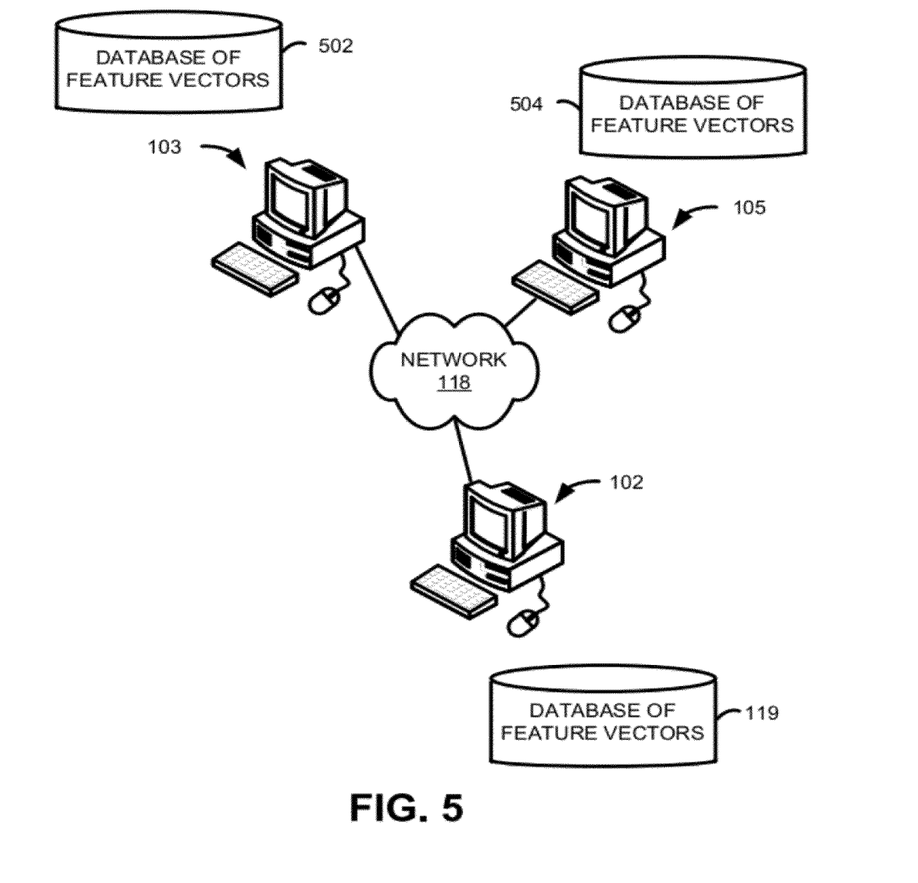
FIG. 5 illustrates one of various network topologies in which multiple face tagging systems share and exchange feature vectors.

Turning now to FIG. 5, FIG. 5 illustrates one of various network topologies in which various face tagging systems 102 and computing systems 103, 105 may share and exchange feature vectors for purposes of tagging photos received by the face tagging system 102 and computing systems 103, 105. As shown, each of the face tagging system 102 and computing systems 103, 105 may have a corresponding database 119, 502, 504 of feature vectors. The face tagging system 102 and computing systems 103, 105 may be communicatively coupled together via a network 118, such as the Internet or a local area network (LAN). To address privacy concerns, the accessibility of the feature vectors in the face tagging system 102 and computing systems 103, 105 may be controlled by the restricted access module 117 in each of the systems 102, 103, 105.

Figure 6:
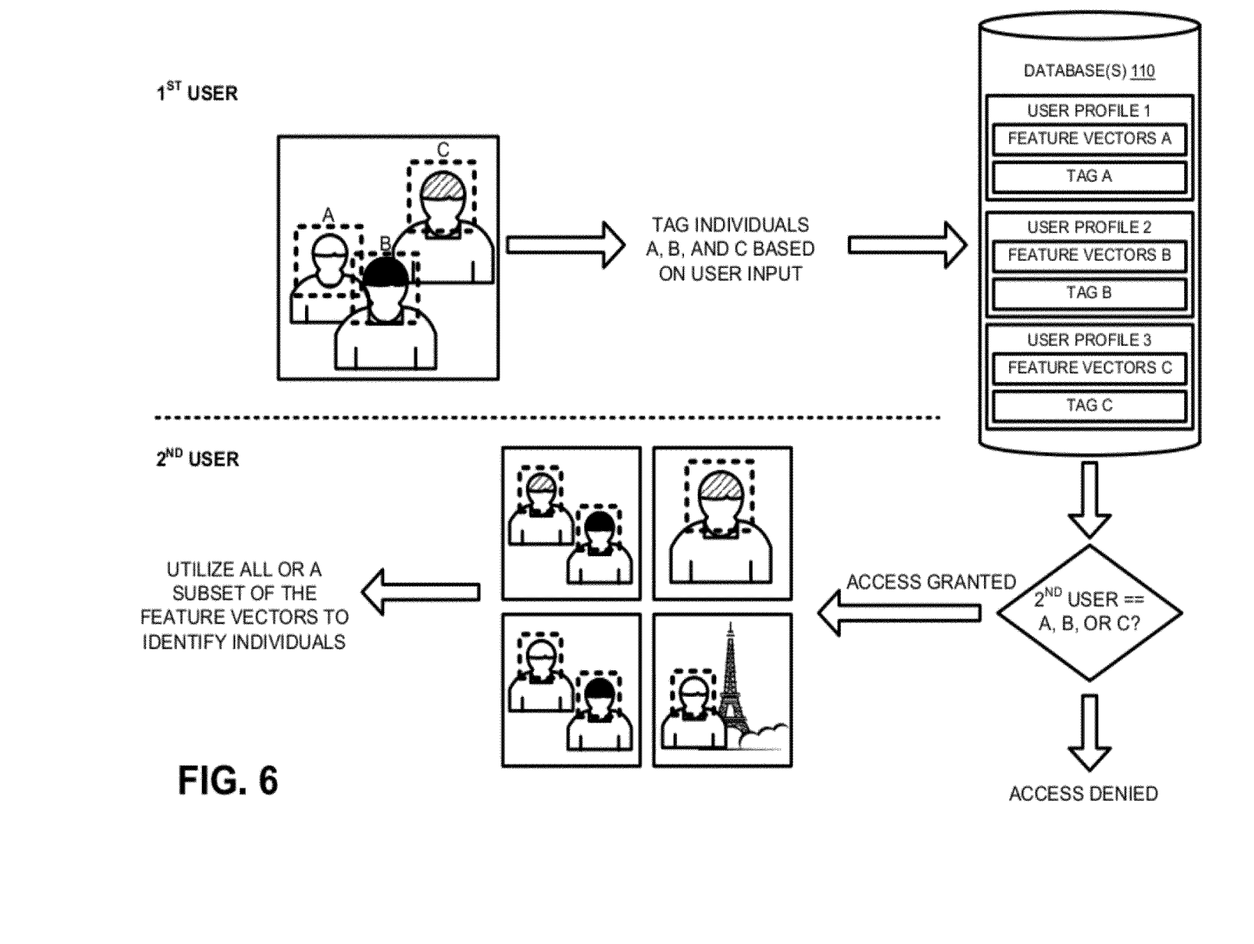
FIG. 6 illustrates an embodiment for restricting access to the feature vectors in the database of FIG. 3.

FIG. 6 illustrates an embodiment for restricting access to the feature vectors in a database 110. For purposes of illustration, consider a first user at a first face tagging system 102 and a second user at a computing system 103, 105. As shown in FIG. 5, the face tagging system 102 and the computing system 103 may be coupled through a network 118. The first user initiates photo analysis of one or more photos received by the face tagging system 102. In the example shown, three individuals (individuals A, B, and C) are detected in a photo by the feature vector module 112, and feature vectors are extracted or identified. The tag module 113 in the face tagging system 102 receives tag data from the first user and associates the tag information with each of the individuals. As described earlier, the tag information may comprise a name, e-mail address, or other descriptor. For some embodiments, three entries are created and stored in the database 110 since three individuals are identified in the photo. Namely, a user profile is established for individuals A, B, and C.

A second user at a computing system 103 may then leverage the analysis already performed by the first user at the first face tagging system 102 to tag photos received by the computing system 103, 105. Due to privacy considerations, however, the first user might elect to limit access by the second user to the database 110. As such, access levels may be defined by the restricted access module 117 to control access by remote users. Accordingly, the second user may be granted access to all or a subset of the feature vectors stored in the database 110 maintained by the face tagging system 102. As a non-limiting example, the face tagging system 102 might grant access only to users corresponding to the user profiles (User Profiles, 1, 2, and 3) currently stored in the database 110. Some embodiments may therefore comprise an identification phase in which the user requesting access first provide identification information. Based on this, the restricted access module 117 determines whether to grant access to the user.

Referring back to the example in FIG. 6, the access level is defined such that only users corresponding to User Profiles 1, 2, and 3 are allowed to utilize feature vectors. For this example, assume that the second user is one of the individuals, for example individual B, in the photo process by the first user. Based on this, the restricted access module 117 in the first face tagging system 102 grants access to the feature vectors. Note that the access level may be defined such that the second user either has access to only feature vectors for individual B or to features vectors for all three individuals A, B, and C. Utilizing the feature vectors in the database 110, the second user can now identify and tag individuals in subsequently received photos. For some embodiments, a check may be first performed to determine whether any of the photos already have an associated tag.

Figure 7:
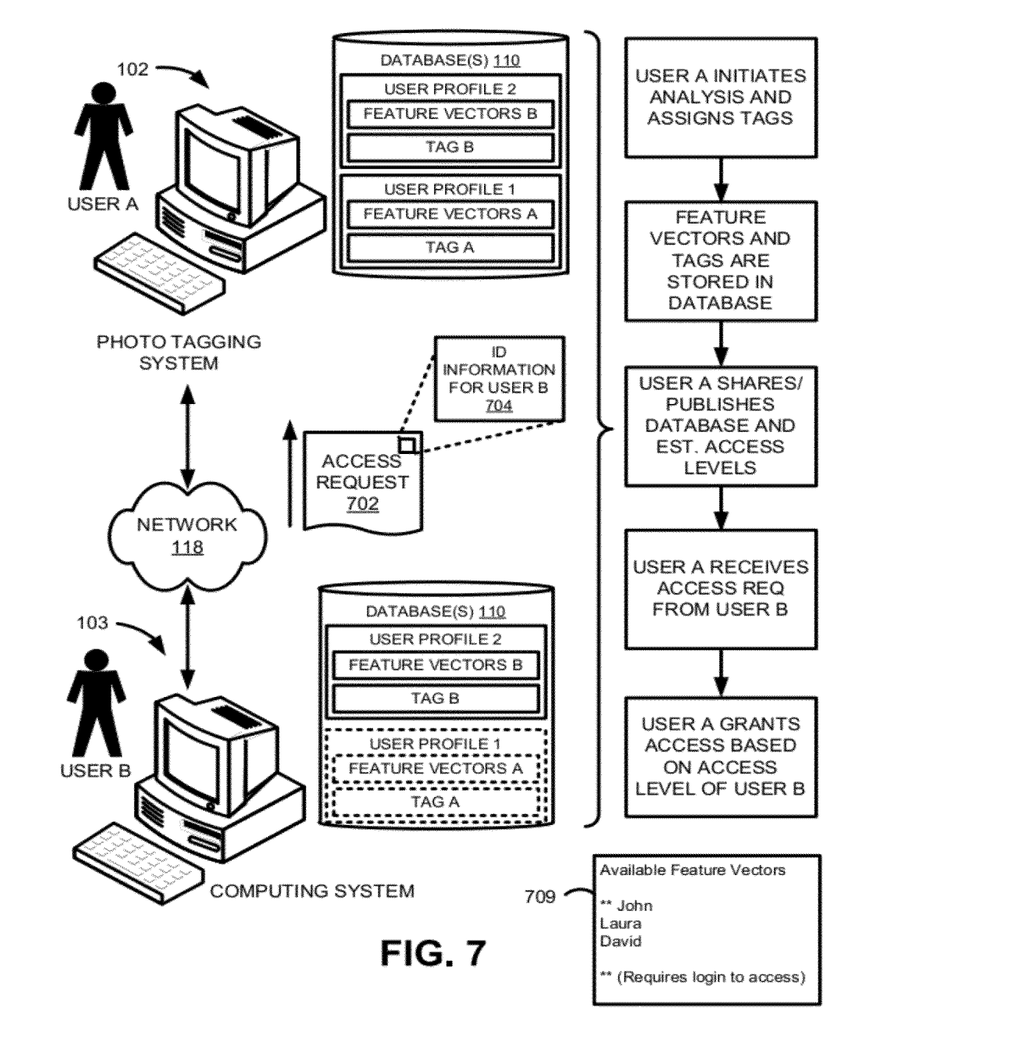
FIG. 7 illustrates an embodiment for performing the identification phase for accessing feature vectors.

FIG. 7 illustrates an embodiment for performing the identification phase for accessing feature vectors. In this non-limiting example, a face tagging system 102 and a computing system 103 are shown. A first user, User A, initiates the analysis and assigns tag information. In particular, the first face tagging system receives a collection of digital photos 115 and extracts feature vectors relating to individuals depicted in the photos 115. The tag information is assigned by User A. As discussed earlier, the feature vectors and an associated tag are then stored in the database 110. User profiles (User Profiles 1 and 2) are also stored in the database 110. As shown, the database 110 in the first face tagging system 102 includes two entries—one for User Profile 1 and one for User Profile 2. User A can then share or publish the feature vectors for a computing system 103 to utilize. As described earlier, some embodiments of the face tagging system 102 may comprise a correlator 114 that determines whether the current set of feature vectors correspond to any of the previously derived feature vectors that have been tagged. The correlator 114 may correlate two sets of feature vectors by identifying common attributes. Based on the tag associated with the previously derived feature vectors, the individual is identified.

For some embodiments, a computing system 103 may view but not download the contents of the database 110 in the first face tagging system 102. This may entail the first face tagging system 102 providing a list of tagged feature vectors available for use by other computing systems 103. In FIG. 7, a sample user interface 709 is shown that lists the feature vectors derived by the first face tagging system 102. While the vector features for Laura and David are generally accessible, the feature vectors for John may be accessed only by those with permission to do so. The second user, User B, sends an access request 702 to User A at the first face tagging system 102. Upon receiving the access request from User B, User A grants access to all or a portion of the feature vectors in the database 110. For some embodiments, the access request 702 sent by User B may comprise identification information 704 associated with User B. The identification information 704 may be received in the form of a login comprising a username and password.

Based on the identification information 704, the restrictive access module 117 in the first face tagging system 102 determines whether to grant User B access. With reference to the illustration in FIG. 7, the computing system 103 is granted access to only the feature vectors of User Profile 2 and not to those of User Profile 1, as denoted by the dashed lines. It should be noted that in addition to addressing privacy and security concerns, network bandwidth utilization is reduced by sending only a portion of the feature vectors across the network 118 to other computing systems 103.

Figure 8:
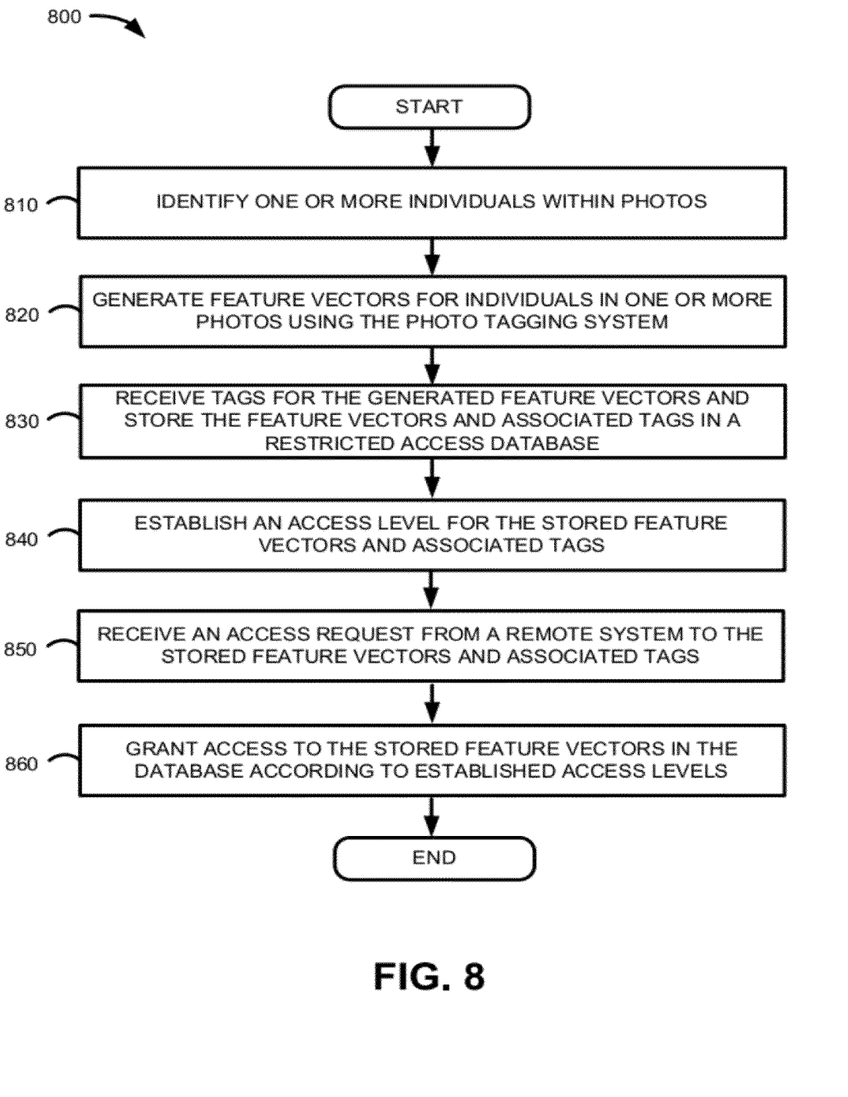
FIG. 8 is a flowchart of an embodiment implemented in a face tagging system for accessing feature vectors and tagging individuals.

FIG. 8 is a flowchart 800 of a method implemented in a face tagging system 102 for accessing feature vectors and tagging individuals. Beginning with block 810, one or more individuals are identified within photos 115 received by the face tagging system 102 in FIG. 1. In block 820, feature vectors are generated for individuals in one or more photos using the face tagging system. For some embodiments, this may comprise extracting feature vectors specifically from the facial regions of individuals in the received photos 115. In block 830, tags are received by the face tagging system for the generated feature vectors. As described earlier, the tags may be received by the face tagging system as user input and may comprise names, e-mail addresses, or other descriptors. The feature vectors and associated tags are then stored in a restricted access database. In block 840, an access level is established for each set of stored feature vectors and associated tag. In block 850, an access request is received from a remote system, whereby the remote system requests access to the stored feature vectors and associated tags. In block 860, access to the stored feature vectors in the database is granted according to established access level.

Figure 9:
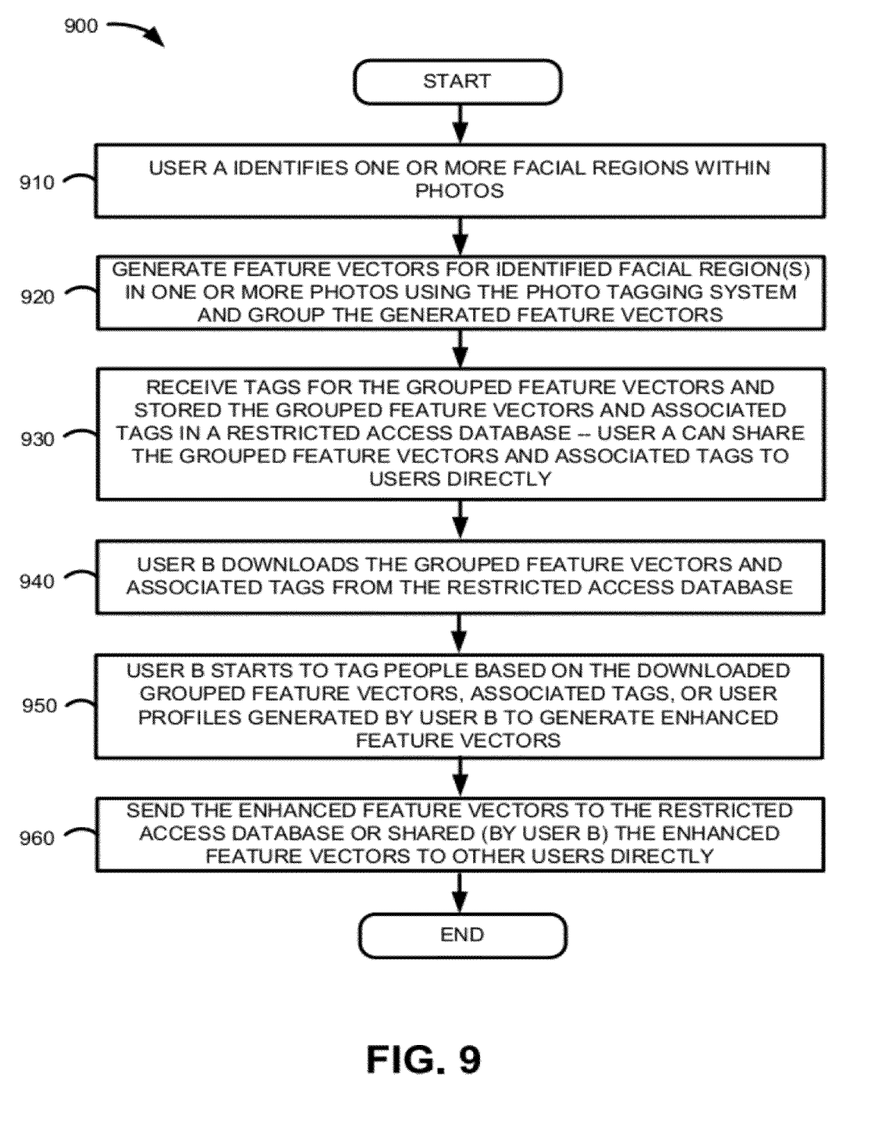
FIG. 9 is a flowchart of an alternative embodiment implemented in a face tagging system for accessing feature vectors and tagging individuals.

FIG. 9 is a flowchart 900 of an alternative embodiment implemented in a face tagging system 102 for accessing feature vectors and tagging individuals. Beginning with block 910, a first user (i.e., User A) identifies one or more facial regions within photos 115. In block 920, feature vectors are generated for the one or more identified facial regions in the photos 115. The feature vectors are then grouped together. In block 930, tags are received for the grouped feature vectors. The grouped feature vectors are stored with their associated tags in a restricted access database. User A can elect to share the grouped feature vectors and their respective tags to users directly.

In block 940, a second user (i.e., User B) downloads the grouped feature vectors and associated tags from the restricted access database. In block 950, User B then begins to tag people based on the downloaded grouped feature vectors, the associated tags, or user profiles generated by User B to create enhanced feature vectors. In block 960, the enhanced feature vectors are either sent back to the restricted access database for future use or shared by User B to others for others to use.

It should again be noted that if embodied in software, each block described above may represent a module, segment, or portion of code that comprises program instructions to implement the specified logical function(s). The program instructions may be embodied in the form of source code that comprises statements written in a programming language or machine code that comprises numerical instructions recognizable by a suitable execution system such as a processor in a computer system or other system such as the ones shown in FIG. 1. The machine code may be converted from the source code, etc. If embodied in hardware, each block may represent a circuit or a number of interconnected circuits to implement the specified logical function(s).

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A computer-implemented method for storing and accessing feature vectors relating to individuals in digital images, comprising:
   identifying one or more facial region within photos;
   generating feature vectors for the one or more facial regions in one or more photos using a face tagging system;
   downloading user profiles from a database over a network;
   grouping the feature vectors and downloaded user profiles;
   collecting, by the face tagging system, tags for the generated grouped feature vectors for generating enhanced user profiles for the individuals;
   storing the enhanced user profiles in a storage resource;
   establishing an access level for the stored feature vectors and associated tags;
   receiving an access request from a remote system to the stored feature vectors and associated tags;
   defaulting to an access level wherein the remote system can access only feature vectors associated with a user of the remote system; and
   setting an access level wherein all identified individuals within the photos have access to the feature vectors.

2. The method of claim 1, further comprising:
   upon storing the enhanced user profiles to the storage, performing one of:
   sending the enhanced user profiles back to the database; and
   sharing the enhanced user profiles with other face tagging systems.

3. The method of claim 1, wherein the user profiles further comprise a user identity and feature vectors.

4. The method of claim 3, wherein the user identity comprises a name, e-mail address, descriptor, or other identifying information.

5. The method of claim 1, wherein setting an access level is performed according to user input.

6. The method of claim 1, further comprising:
   for subsequently received photos, utilizing the enhanced feature vectors to identify one or more individuals; and
   receiving confirmation by a user regarding the identification of the one or more individuals.

7. The method of claim 1, further comprising storing the established access levels for the stored feature vectors and associated tags in a server.

8. The method of claim 1, wherein receiving an access request from a remote system to the stored feature vectors and associated tags comprises:
   receiving identification information relating to the user of the remote system;
   based on the identification information, granting access to the stored feature vectors in the database according to the established access level.

9. The method of claim 8, wherein granting access to the stored feature vectors comprises sending a portion of the feature vectors stored in the database to the remote system over a network.

10. The method of claim 8, wherein granting access to the stored feature vectors comprises accessing the stored feature vectors based on at least one of:
   date information, time information, and one or more tag relationships.

11. A system for storing and accessing feature vectors relating to individuals in digital images, comprising:
   a feature vector module for receiving digital photos and user profiles, extracting feature vectors of individuals;
   a correlator configured to group the feature vectors and the user profiles according to individuals;
   a tag module configured to receive a tag for the generated grouped feature vectors for generating enhanced user profiles for the individuals;
   establishing an access level for the feature vectors and associated tag;
   receiving an access request from a remote system to the feature vectors and associated tag;
   defaulting to an access level wherein the remote system can access only feature vectors associated with a user of the remote system; and
   setting an access level wherein all identified individuals within the photos have access to the feature vectors.

12. The system of claim 11, wherein the tag module further comprises sending the enhanced user profiles back to a database.

13. The system of claim 12, wherein the database further comprises sharing the enhanced user profiles with other face tagging systems.

14. The system of claim 11, wherein the system further comprises a restricted access module configured to establish an access level for the each of the individuals of stored feature vectors and associated tags, the restricted access module further configured to receive an access request from a remote system for the stored feature vectors and associated tags.

15. The system of claim 14, wherein the restricted access module is further configured to store the established access levels in the database.

16. The system of claim 14, wherein the restricted access module is further configured to receive identification information regarding a user of the remote system as part of receiving an access request.

17. The system of claim 16, wherein the restricted access module determines if the received identification information regarding a user of the remote system matches any tags in the database.

18. The system of claim 14, wherein the restricted access module establishes customized access levels for the stored feature vectors according to user input.

19. The system of claim 11, wherein the tag comprises at least one of: name, e-mail, and a login identifier.

20. A non-transitory computer readable medium; comprising computer-program instructions executable by a processor, the computer-program instructions comprising instructions for:
   generating feature vectors for individuals in digital photos received by a face tagging system;
   downloading user profiles from a database over a network;
   grouping the feature vectors and downloaded user profiles;
   receiving tags for the generated grouped feature vectors and downloaded user profiles for generating enhanced user profiles for the individuals;
   storing the enhanced user profiles to a storage resource;
   establishing an access level for the stored feature vectors and associated tags;
   receiving an access request from a remote system to the stored feature vectors and associated tags;
   defaulting to an access level wherein the remote system can access only feature vectors associated with a user of the remote system; and
   setting an access level wherein all identified individuals within the photos have access to the feature vectors.

21. The computer-readable medium of claim 20, further comprising establishing an access level for each of the user profiles; and granting access by a second face tagging system to feature vectors according to the established access level for each of the user profiles.

22. The computer-readable medium of claim 21, further comprising instructions for receiving identification information relating to the user of the second face tagging system.

23. The computer-readable medium of claim 20, further comprising instructions for:
  utilizing the accessible feature vectors to identify one or more individuals for subsequently received photos; and
  receiving confirmation regarding the identification of the one or more individuals.

24. The computer-readable medium of claim 20, wherein the instructions for establishing an access level for each of the user profiles establishes access levels according to one or more of:
  user input; and
  default access levels.

* * * * *